(No Model.)
E. C. NICHOLS.
HYDRAULIC MOTOR.
No. 516,164.  Patented Mar. 6, 1894.
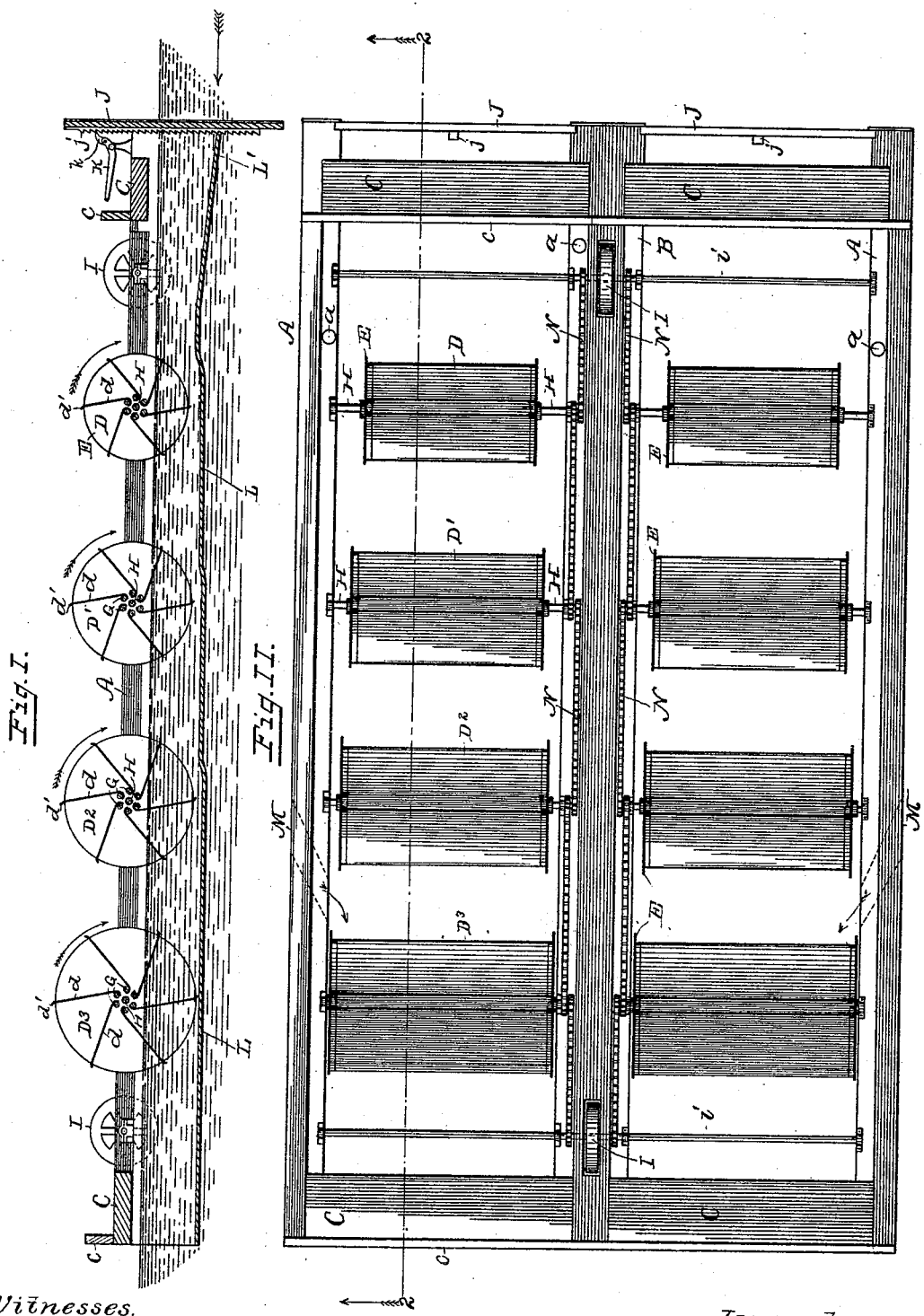
Witnesses.
J. D. Stanton
Thomas Wright
Inventor
Edwin C. Nichols.
By John S. Duffie
His Attorney.

(No Model.) 2 Sheets—Sheet 2.
E. C. NICHOLS.
HYDRAULIC MOTOR.
No. 516,164. Patented Mar. 6, 1894.
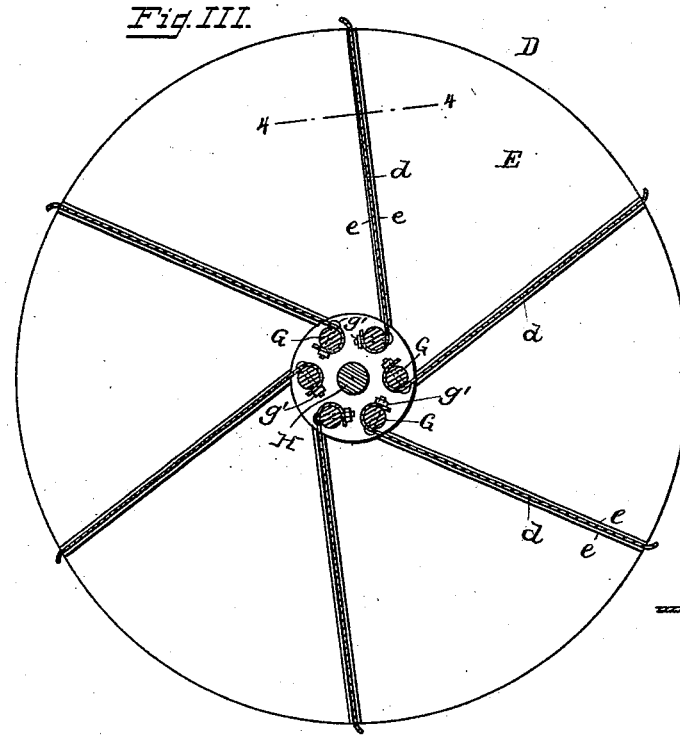
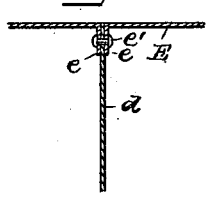
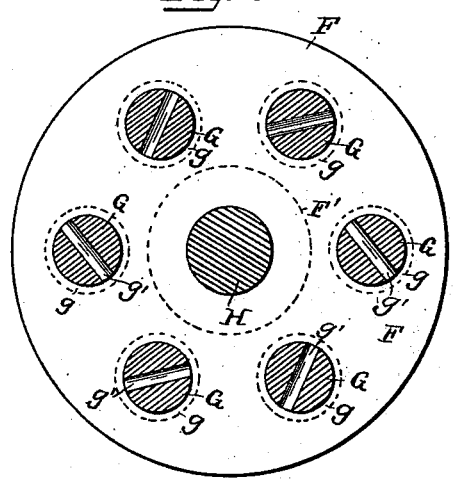
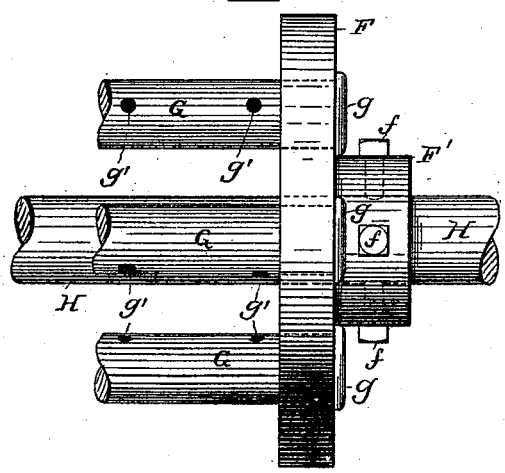
Witnesses.
J. D. Stanton
Thomas Wright
Inventor
Edwin C Nichols
By John S. Duffie
His Attorney

UNITED STATES PATENT OFFICE.

EDWIN C. NICHOLS, OF KANSAS CITY, MISSOURI, ASSIGNOR, BY MESNE ASSIGNMENTS, TO SHIRLEY M. NICHOLS, MARTHA A. MELVILLE, AND W. G. MELVILLE, OF SAME PLACE.

HYDRAULIC MOTOR.

SPECIFICATION forming part of Letters Patent No. 516,164, dated March 6, 1894.

Application filed May 16, 1893. Serial No. 474,433. (No model.)

*To all whom it may concern:*

Be it known that I, EDWIN C. NICHOLS, a citizen of the United States, residing at Kansas City, in the county of Jackson and State of Missouri, have invented certain new and useful Improvements in Hydraulic Motors, of which the following is a full, clear, and exact description, reference being had to the accompanying drawings, forming a part hereof.

My invention relates to improvements in hydraulic motors, and my objects are: First: to provide a motor to be anchored in a flowing stream, wherein a series of revoluble paddle wheels are secured on suitable floats, to generate power that may be conveyed to a place more or less remote. Second: to provide a hydraulic motor, having a series of metallic paddle wheels, which, by their peculiar construction will create the greatest possible power, and at the same time be light, simple and durable. Third: to so construct the paddle wheels that a pneumatic relief is generated as said wheels revolve, as hereinafter described and with these objects in view, my invention consists in the novel construction of the paddle motor wheels, and their arrangement on the floats hereinafter fully specified, and illustrated in the accompanying drawings, in which—

Figure I, represents a longitudinal section of the motor, taken on line 2, 2, of Fig. II. Fig. II, is a plan view of same showing more clearly the arrangement of the paddle wheels on the floats. Fig. III, is a sectional detail view of one of the paddle wheels, showing the manner in which the blades are secured to the rods. Fig. IV, is a partly broken away sectional view, taken on line 4, 4, of Fig. V, showing the manner of securing the blades to the end disks, by means of rivets which pass through the flange. Fig. VI, is a sectional detail view on an enlarged scale of the rods to which the blades are attached, and of the main shaft which carries said paddle wheel;—and, Fig. VI, is a partly broken away side view of same, showing more clearly the manner of securing said rods in the circular plate which is secured on the main shaft.

Referring to the drawings by letter A, represents the two outside floats which may be constructed of any suitable material and in such a manner as to be most adaptable to the purpose for which they are designed.

B, is the center float which is made larger than the outer floats A, A, and these floats are to be connected by gangways C, C, and braced by trusses c, c, or their equivalent. Said floats A, A, B, are provided with valves a, a, a, through which, water may be admitted by any suitable pump for properly ballasting the floats.

D, D', D², D³, represent the paddle wheels constructed substantially as shown, each consisting of two circular end walls or disks E, made in sections having flanged projections e, between which the blades d, are rigidly secured by means of rivets e', as seen in Fig. VI. Said blades d, are bolted to the rods G, by means of suitable bolts g', as illustrated in Fig. III, and are secured in position on a tangent to the rods G, so as to offer the greatest possible surface to the current, thus increasing the capacity of the wheel. The rods G, are secured in end plates or disks F, as shown in Figs. V and VI, and have a flattened or rounded head g, on one end, and a corresponding nut on the opposite end.

The end plate or disk F, is provided with a collar or flange F', through which a number of set-screws f, may pass, for securing said plate or disk to the main shaft H. As the wheels are revolved by the force of the flowing current the blades, as they enter the water have a tendency to compress the air contained between said blades, and upon leaving the water, a vacuum is created, and with my peculiar method of construction, I utilize the air which is compressed by the entering blades to fill the vacuum formed by the blades which are leaving the water, by permitting it to pass over the rods G, thus forming a pneumatic relief, which greatly facilitates the action of the wheels.

I, I, represent balance wheels, which are secured on line shafts i, i, to which may be applied any suitable gearing for transmitting the power generated by the motor, to a place more or less remote. Said line shafts i, i, and main shafts H, are geared together by a series of sprocket chains N, N, or their equivalent, and all of said shafts are mounted in suitable boxings which hold them in position.

J, represents a flood gate constructed at the front of the motor, and this gate is operated by means of a lever K, having a dog $k$, which operates in a ratchet bar $j$, as shown in Fig. I.

L, represents a double inclined metallic bottom built in the motor over which the water must pass. The front end L', of this bottom inclines downwardly so as to convey the greatest possible current through the motor, and the rear end of said bottom also inclines downwardly. The highest part of said bottom being immediately in front of the front paddle wheel D, and each succeeding paddle wheel is made larger than the one immediately preceding it, so that the peripheries of said paddle wheels will come nearly to the said bottom. The current when it strikes the first paddle wheel is disturbed and somewhat diverted from its course, and if the second wheel was no larger than the first the power of the water against it would be diminished, so it is made large to take a deeper hold on the water and so with each succeeding wheel.

In front of the rear paddle wheels I provide openings M, M, through which a side feed may be furnished to said wheels if so desired.

In building the motor, I preferably construct the first set of paddle wheels D, D, smaller and shorter than the next two D', D', and these (D', D',) smaller and shorter than the next two $D^2$, $D^2$, and so on through the series, if found practicable, though I do not confine myself to this form of construction.

The flood gate J, may be lowered so as to rest below the bottom of the motor, which will, in a narrow stream increase the flow of the current through the motor and thereby increase its power.

The floats A, A, B, are constructed so as to form air tight compartments, and as before specified, may be filled, or partly filled with water, to properly ballast same when so desired.

The paddle wheels are preferably, constructed of sheet metal which will add to their strength, and at the same time cause them to be light and durable. These paddle wheels may be mounted on floats as illustrated, or may be mounted on stationary abutments with adjustable bearings, where it is desired to so mount same.

Having thus fully described my invention, what I claim, and desire to secure by Letters Patent, is—

1. A hydraulic motor having paddle wheels, consisting of the central shaft H, disks F, secured on said shaft, rods G, secured in said disks; a series of blades $d$, having their inner edges secured to rods G; end disks E, securing the ends of said blades, substantially as shown and described and for the purposes set forth.

2. A hydraulic motor having paddle wheels, consisting of the central shaft H; disks F, secured on said shaft; rods G, secured in said disks and around said shaft; a series of blades $d$, set at a tangent to said rods and having their inner edges secured to said rods, and end disk E, securing the ends of said blades, substantially as shown and described and for the purposes set forth.

3. In a hydraulic motor the paddle wheels, consisting of circular end disks E, formed in sections and having flanges $e$; a series of blades $d$, having their ends secured to the flanges $e$, of said disks and their inner edges secured to the rods G; rods G, secured in the disk F; and disks F, secured on the central shaft H, substantially as shown and described and for the purposes set forth.

4. A hydraulic motor, consisting of the paddle wheel support, consisting of the floats A, A, and B, provided with valves $a$, gang ways C, trusses $c$, side feeds M, double inclined bottom L. L'; and paddle wheels D. D', $D^2$, and $D^3$, journaled in said support, the first set of paddle wheels being shorter and smaller than the next set, and so through the series, substantially as shown and described and for the purposes set forth.

In testimony whereof I affix my signature in presence of two witnesses.

EDWIN C. NICHOLS.

Witnesses:
J. D. STANTON,
THOMAS KNIGHT.